UNITED STATES PATENT OFFICE.

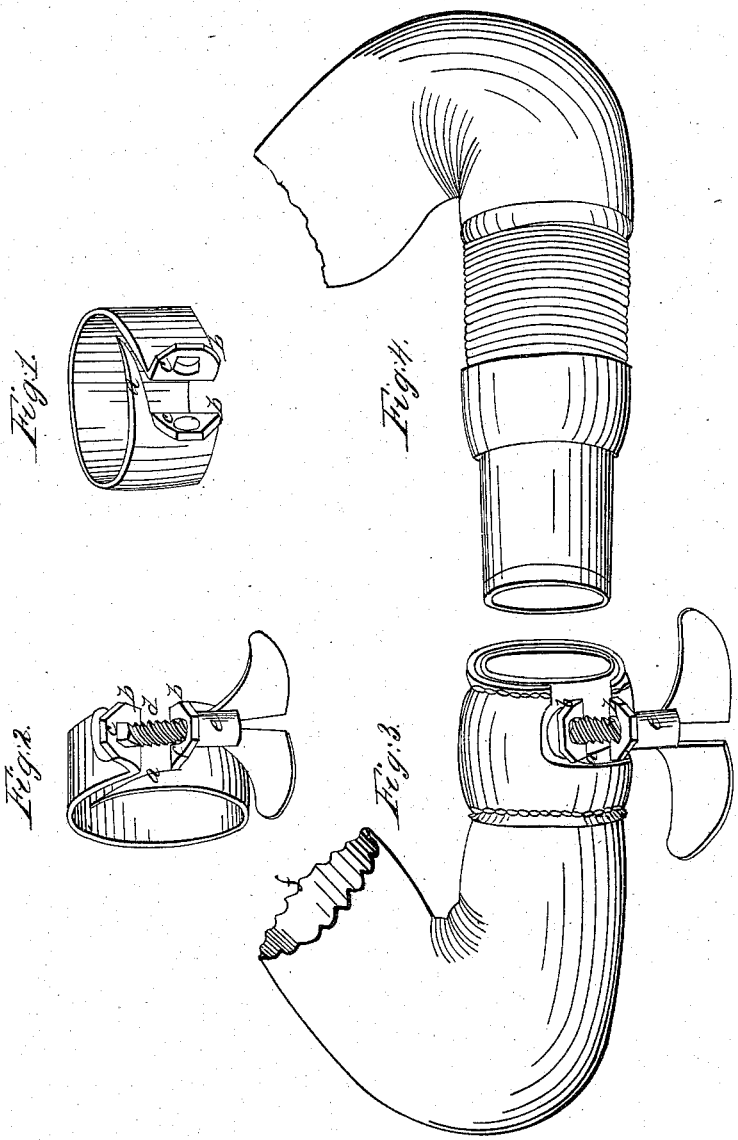

A. W. CARY, OF BROCKPORT, NEW YORK.

HOSE-COUPLING.

Specification of Letters Patent No. 8,716, dated February 10, 1852.

*To all whom it may concern:*

Be it known that I, ALBIGENCE W. CARY, of the village of Brockport, in the county of Monroe and State of New York, have invented a new and useful Improvement on a Spring Clasp or Band Used for Coupling Hose or Flexible Pipe, also for connecting hose with any inflexible tube, such as the spout of a pump, fire-engine hydrant, &c.; and I here do declare that the following is a clear, full, and exact description, reference being had to the accompanying drawings and to the letters of reference marked thereon.

The nature of my invention consists in providing a spring clasp or band of any suitable material of such a form that a part of one or both ends shall extend beyond the place of fastening, the object of such extension being to secure the uninterrupted pressure or contracting force of the clasp around the entire circumference of inserted tube, and thus form a joint which shall be perfectly water tight under any hydraulic force which the hose shall sustain.

To enable others skilled in the art to make and use my invention I will proceed to describe more particularly its construction and operation.

I provide a clasp or band of any suitable material which shall have sufficient elasticity or spring to allow the necessary contraction by means of a screw, the ends being a convenient distance apart when the clasp is relaxed. A part of both ends is turned up from the circular form of the band forming two ears which are parallel when drawn together; for the purpose of receiving a screw as seen in the drawing Fig. 2. A portion of one or both ends of the clasp which is not turned up to receive the screw is extended some distance beyond the place of fastening and the corresponding portion opposite is made of such shape that the extended part may freely pass, fitting as closely as may be convenient. An exact fit not being necessary to a perfect joint since the clasp may be considerably dilated from its contracted dimensions, as when the inserted tube is larger than the clasp would admit without dilation, and even in this case the extended part so binds across the part near the screw which would otherwise be left untouched by a clasp not especially providing for this, that a water tight joint is secured with as much facility as when the ends of the clasp are brought together, so that one clasp may be employed with hose or tubes of several different diameters. The material which I generally use for the clasp is an alloy of copper and zinc first casting it of a proper form and then obtaining the requisite elasticity or spring by hammering upon the part opposite the opening making it a little thinner than the rest of the clasp.

The clasp is firmly attached to leathern hose by placing it around the hose near the end and then stitching over it a piece of leather leaving an opening for the parts through which the screw passes.

If india-rubber or other hose be used a small piece of leathern hose to which the clasp has been attached may easily be fastened upon whatever kind of hose may be used.

In coupling together two pieces of hose one having the clasp attached I provide the other with a short inflexible tube of suitable diameter having a slightly raised rim as seen in Fig. 4 of the drawings. This is inserted into the clasp, and by turning the thumb-nut the two pieces of hose are almost instantly coupled and a perfectly water tight and even air tight joint is formed.

*Note.*—If a very large clasp is required it may be useful to extend part of both ends.

*Description of Drawings.*—Figure 1 represents the clasp *a*—that portion of the clasp extended beyond the place of fastening *b b* that portion of each end turned up as ears to receive the screw; the aperture in one of these being of such shape as to prevent the screw from turning. Fig. 2, the extended clasp with the screw and thumb-nut. Fig. 3 shows the mode of attaching the clasp to hose. Fig. 4 shows the tube attached to hose and prepared to be inserted into the clasp.

I am aware that spring clasps and circular bands have been in use for various purposes for splicing masts, fishing rods, etc., similar in their general forms to that I have above described yet differing essentially in their possessing no adequate provision for forming a water tight coupling suitable for hose.

I am also aware that a patent was granted in May 1840 to Mr. Ralph Bulkley for a coupling clasp of a spiral form making one complete circle and a portion of another to be used for coupling hose.

The differences from the clasp just mentioned which I believe renders my extended clasp superior to the spiral clasp of R. Bulkley are as follows:—

1. The contracting force of my extended clasp is applied in a direct line so as to bind the circumference of the inserted tube with greater uniformity of pressure than could be secured in a spiral form—since the more oblique—and lengthened form of the spiral clasp presents much greater liability to unequal and imperfect contraction from the irregular friction of the parts and also from the fact that in a spiral clasp the line of contraction is not parallel with the axis of the screw.

2. The extended clasp is much more simple in its use and more cheap in its construction. It may be cast so complete as to require very little further labor.

3. It is also with very great facility attached to hose as before described.

4. It is never liable to get out of repair.

5. Its strength may be indefinitely increased without any inconvenient enlargement of its bulk.

6. The ears or part which receive the screw being in the direct line of contraction are less liable to be broken and the clasp itself is in no danger of being twisted so as to produce an imperfect joint.

I do not claim as my invention the clasp in its general form or as made to spring and used with a screw.

I claim and desire to secure by Letters Patent—

The clasp of the particular form above described—having a part of one or both ends extended beyond both places of fastening so as to extend the contracting pressure directly around the entire circumference of an inserted tube [see drawing Fig. 1 letter *a*] which extension I claim as a new and useful improvement on all clasps or bands used for coupling hose with which I am acquainted.

ALBIGENCE W. CARY.

Witnesses:
E. WHITNEY,
L. A. WHEELER.